J. M. KAMINSKY.
FLUID PRESSURE REGULATOR.
APPLICATION FILED APR. 18, 1912.

1,079,985.

Patented Dec. 2, 1913.

WITNESSES:
A. H. Edgerton.
O. M. McLaughlin

INVENTOR.
Julius M. Kaminsky.
BY
V. H. Lockwood
ATTORNEY.

UNITED STATES PATENT OFFICE.

JULIUS M. KAMINSKY, OF INDIANAPOLIS, INDIANA.

FLUID-PRESSURE REGULATOR.

1,079,985. Specification of Letters Patent. Patented Dec. 2, 1913.

Application filed April 18, 1912. Serial No. 691,543.

*To all whom it may concern:*

Be it known that I, JULIUS M. KAMINSKY, a citizen of the United States, and a resident of Indianapolis, county of Marion, and State of Indiana, have invented a certain useful Fluid-Pressure Regulator; and I do hereby declare that the following is a full, clear, and exact description thereof, reference being had to the accompanying drawings.

The object of this invention is to provide a simple, economical and yet efficient automatic pressure regulator for fluids flowing through pipes or other conduits.

The invention has been made with particular reference to use in connection with sanitary drinking fountains coupled with other pipes through which water passes under pressure and the object of the invention is to prevent irregularities of the pressure of the water issuing from the pipe and, therefore, prevent the water from spouting up into the face of the person using the drinking fountain. However, the invention is not limited to this particular use, as it may be used in many other situations.

The chief feature of the invention consists in placing within the pipe or conduit a tapering spiral spring located centrally within the pipe and with one end fixed and the free end carrying a head which receives the initial pressure of the fluid coming through the pipe so that as the pressure increases against said head, the spring will be more and more collapsed and thus substantial uniformity of the pressure of the fluid as it issues from the pipe, be attained.

Figure 1:
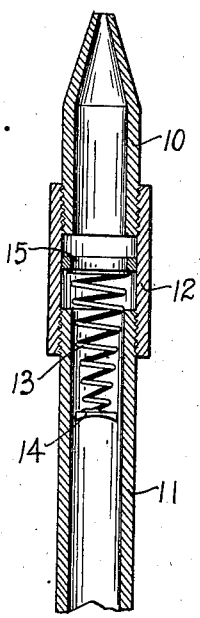
Figure 2:
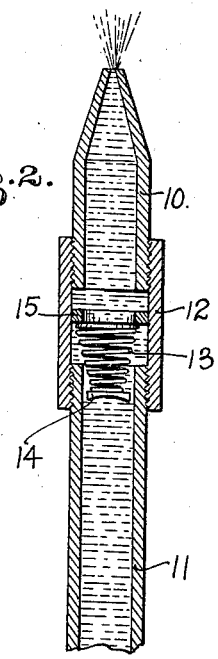

The nature of the invention will be understood from the accompanying drawings and the following description and claims:

In the drawings, Figure 1 is a central longitudinal section through the pipe containing said regulating means, the same being in idle condition. Fig. 2 shows the condition of the regulating means when under pressure. Fig. 3 is a similar section showing a modified form of regulating means in idle condition. Fig. 4 is the same excepting that the regulator is shown in elevation and under pressure.

There is shown herein a nozzle 10 through which the fluid escapes from a supply pipe 11. They may be connected by a threaded sleeve or section 12.

The regulating means consists of a tapering spiral spring 13 which has secured on its smaller end a pressure head 14 of somewhat less diameter than the internal diameter of the pipe. The large end of the spring is fixed by any means within the pipe. Herein it is shown fastened to a ring 15 which is located in the sleeve 12. Whatever means is employed to hold the fixed end of the spring in place should be such as to maintain the spring substantially central in the pipe, although that is not vital.

The operation is as follows: Fluid going through the pipe under pressure in the direction of the arrow in Fig. 2, bears against the pressure head 14 and collapses the spring in proportion to the pressure. The collapsing of the spring relatively diminishes the area of passageways through the spring for the movement of the fluid. Thus if the spring were completely collapsed by an extremely heavy pressure, it would almost, if not entirely, close the passageway. If the pressure was not so great, it would leave correspondingly more space for escape through the spring. Thus this regulator will maintain approximately a uniform pressure in the nozzle and at least interfere with the passage of the fluid through the pipe sufficiently to prevent it spurting too much.

I claim as my invention:

1. In a regulator of the flow of fluid, the combination with a conduit, of a spring coiled longitudinally therein and normally expanded with one end surrounding the passage for the fluid so that the fluid must flow through the convolutions thereof, and a head on the other end of the spring constructed to give a passage for fluid past it of a constant caliber which is greater than that of the passage through the convolution of the spring during the period when the flow through the regulator is being changed.

2. In a regulator of the flow of fluid, the combination with a conduit, of a tapering spring coiled longitudinally therein with the large end secured to the conduit and surrounding the passage for the fluid and said spring expanded normally so that fluid will pass through its convolutions and with the means attached to the small end of the spring in position to be acted upon by the impact of the fluid, said means constructed to give a passage for fluid past it of a constant caliber which is greater than that of the passage through the convolutions of the spring during the period when the flow through the regulator is being changed.

3. In a regulator of the flow of fluid, the combination with a conduit, of a tapering spring coiled longitudinally therein with the large end secured to the conduit and surrounding the passageway for the fluid, said spring being expanded normally so that the fluid may pass through its convolutions, and a head on the small end of said spring constructed to give a passage for fluid past it of a constant caliber which is greater than that of the passage through the convolutions of the spring during the period when the flow through the regulator is being changed.

4. In a regulator of the flow of fluid, the combination of a conduit with two tubes and a connecting removable sleeve, a ring in said sleeve with an opening through it for the passage of fluid, a coiled spring with one end secured to said ring and surrounding the opening therethrough and normally expanded to admit fluid through the convolutions thereof, and a head on the free end of the spring constructed to give a passage for fluid past it of a constant caliber which is greater than that of the passage through the convolutions of the spring during the period when the flow through the regulator is being changed.

In witness whereof, I have hereunto affixed my signature in the presence of the witnesses herein named.

JULIUS M. KAMINSKY.

Witnesses:
G. H. BOINK,
E. H. MAYO.